Aug. 25, 1959  G. C. TIBBETTS ET AL  2,901,644

ELECTROMECHANICAL DEVICE AND METHOD OF MAKING SAME

Filed Dec. 5, 1955

Inventors
George C. Tibbetts
Raymond W. Tibbetts
by Roberts, Cushman & Grover
Attys

2,901,644

Patented Aug. 25, 1959

2,901,644

ELECTROMECHANICAL DEVICE AND METHOD OF MAKING SAME

George C. Tibbetts and Raymond W. Tibbetts, Camden, Maine, assignors to Tibbetts Laboratories, Inc., Camden, Maine, a corporation of Maine Application December 5, 1955, Serial No. 551,111

8 Claims. (Cl. 310—9.1)

This invention relates to the art of electromechanical devices such as piezoelectric plate assemblies for interconverting electrical and mechanical energy, and more particularly to an assembly including an extremely thin and frangible piezoelectric plate or wafer with electrodes on opposite sides. As is well known in the art, in one important type of piezoelectric element, with which the present invention is concerned, mechanical energy applied along a flatwise or mechanical axis of the plate, causing the plate to expand and contract, i.e., vibrate edgewise, generates a corresponding electrical potential between the electrodes.

The usual piezoelectric plate is of sufficient thickness that it may be handled during manufacture and use without danger of cracking or breaking. However, it is sometimes necessary to manufacture and use a plate of extreme thinness in order to obtain sufficient electrical capacitance between the aforementioned electrodes or to obtain sufficiently low mechanical impedance of the plate at its points of attachment where it is driven mechanically by other elements of the transducer. Such a plate may be so thin as to be unusually subject to breakage when flexed despite careful handling.

Accordingly a main object of the invention is to protect the extremely thin plate against flexural rupture without appreciably impeding the edgewise vibration of the plate.

According to the invention an electromechanical assembly, which includes a piezoelectric plate ground thin from a blank, is made by a method which comprises polishing one side of the blank, preferably attaching an electrode, or electrodes if more than one are desired, to the polished side, temporarily attaching the electroded side of the blank to a rigid surface, and, while the blank is attached to the surface, eroding, i.e., etching or grinding the other side of the blank until the blank is reduced to a plate of the desired thickness, and, also while the blank is attached to said surface, attaching to said other side of an electrode or electrodes and adhering to said other side a resilient facing of sheet material having a thickness at least one-half as great as the plate and a substantially lower elastic modulus, and thereafter removing the assembled plate and facing from the surface. The plate thus protected against flexural stresses may be handled carefully, although preferably an identical facing is also applied to the side of the blank which was temporarily attached to the rigid surface.

Further, according to the invention, an electromechanical assembly is produced which comprises the aforesaid extremely thin, frangible piezoelectric plate, electrodes attached to opposite sides of said plate, and a facing of sheet material adhered to at least one of said sides and electrodes, the facing being a resilient material or laminate of materials having an effective elastic modulus substantially less than the plate so as to permit substantially unimpeded edgewise vibration of the plate, and the facing being at least substantially one-half as thick as the plate so as to reinforce the pate flexurally, whereby the assembly may be handled without breaking the plate.

For the purpose of illustration typical embodiments of the invention are illustrated in the accompanying drawing in which.

Figure 1:
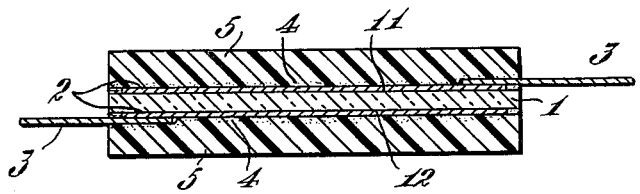
Fig. 1 is a vertical section of a piezoelectric plate assembly according to one form of the invention.

As shown in Fig. 1 the protected piezoelectric assembly comprises a thin plate of piezoelectric material such as Rochelle salt or polarized barium titanate ceramic having polished upper and lower surfaces 11 and 12. Attached to the upper and lower faces 11 and 12 are electrodes which may be metal leaf or foil or an electrically conductive coating, according to the nature of the piezoelectric material, which cover nearly the entire surface of plate 1. For example, gold electrodes may be adhered to a Rochelle salt plate by moistening the faces 11 and 12 of the plate, thereby superficially dissolving the faces and thereafter pressing golf leaf into intimate contact with the plate, in accordance with R. W. Tibbetts United States Patent No. 2,287,950. Connecting leads 3 are secured to the electrodes 2 so as to extend beyond the edges of the plate 1. To the two sides of the plate 1 carrying the electrodes 2 relatively thick sheets 5 of organic plastic are bonded by an adhesive 4, such as polyvinyl acetate.

Figures 3, 4:
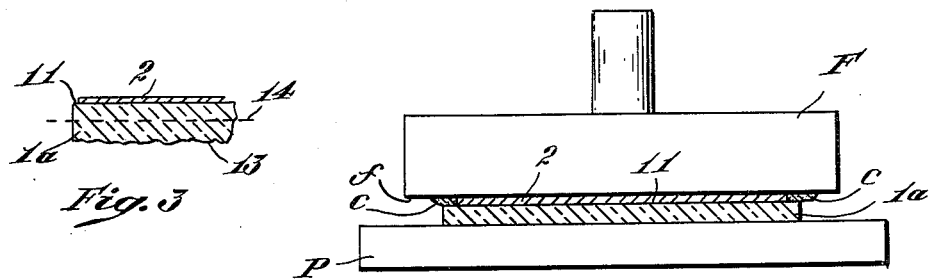
Fig. 3 is a vertical section of a fragment of a piezoelectric blank.
Figs. 4 and 5 illustrate two steps in the manufacture of the assembly.
Figures 5, 6:
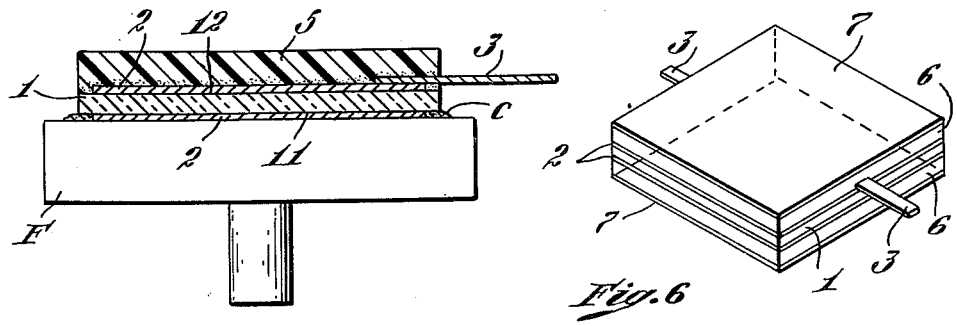
Fig. 6 is an isometric view of the assembly of Fig. 2.

The assembled device, shown in section in Fig. 1, is preferably manufactured by a method illustrated in Figs. 3 to 5. In Fig. 3 is shown a rough blank 1a of piezoelectric material. To permit handling, the blank is of greater thickness than the finished thickness indicated by the broken line 14. One face 11 having been polished, an electrode 2 is applied thereto. The electroded side 11 of the blank 1a is then attached to the flat face f of a grinding fixture F by any suitable cement C. Thereafter the blank 1a is ground or etched and polished to the desired thickness 14 on a grinding plate P. The resulting thin plate 1 which may be, by way of example only, 0.003 inch thick, has insufficient flexural strength to be handled without great likelihood of breakage, and prior to removing the blank from the fixture F, a second electrode 2 is applied to the second polished face and thereafter the facing 5 is attached by adhesive 4 over the electrode 2 and its lead 3, as shown in Fig. 5. The cement C may then be softened and the partial assembly removed from the fixture F without danger of breakage if the assembly is handled carefully. Thereafter a second like protective facing 5 is applied over the electrode 2 on the polished surface 11 of the plate 1 which was attached to the fixture.

According to the invention the facings 5 have a much lower elastic modulus than the plate 1, and are at least one-half as thick and preferably one or more times as thick as the plate. For example, sheets of a material, e.g. a thermoset polysulfide modified epoxy resin, with an elastic modulus about one-hundredth that of the plate and five times as thick as the plate will increase the flexural strength of the assembly by about thirteen times. Owing to the low elastic modulus the facings will in this example reduce the electromechanical coupling coefficent of the piezoelectric plate only about 5%.

Figure 2:
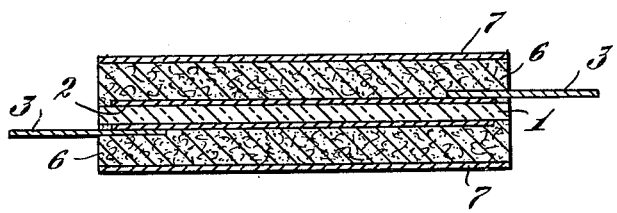
Fig. 2 is a like section of another form of the invention.

An alternate type of facing shown in Figs. 2 and 6 may be applied to the crystal plate 1 by the method described above. The facing shown in Figs. 2 and 6 comprises a layer of separating and bonding material of very low elastic modulus, preferably a soft fibrous sheet material such as Aldar lens tissue No. 51 manufactured by the Aldine Paper Company, New York city. Such a paper is soft, open textured and of low density. Prior to adhering the facing to the plate 1 the paper 6 is laminated with a sheet of metal foil 7 by impregnating the paper with a solution adhesive of low solids content, e.g. 10% and attaching the foil thereto and allowing the laminate to dry. Other thin sheet material having an elastic modulus substantially higher than the low modulus layer may be used in place of metal foil, for example, thin glass ribbon or sheet of the same order of thickness as metal foil. Sheets cut from the dry laminate are bonded to the electroded plate 1 by activating the adhesive within the paper by a solvent for the adhesive applied to the plate just before assembly of the laminate to the plate. The protective foils 7 greatly reinforce the flexural strength of the assembly by virtue of their being spaced from the plate 1 by the relatively thicker paper layer 6, but by virtue of their thinness relative to the plate do not impede the edgewise vibration of the plate 1 substantially. Preferably the effective edgewise elastic modulus of such a laminated facing is less than one-fifth that of the piezoelectric plate. The paper layer 6 of Fig. 2 is of the same order of thickness or thicker than the crystal plate 1, but by virtue of its soft open texture and the low concentration of the adhesive with which it is impregnated, the paper layer does not substantially reduce the ability of the plate 1 to vibrate along its mechanical axis.

Piezoelectric assemblies prepared according to the present invention retain all the desired properties electrical and mechanical of an unprotected plate, and can utilize a wafer which would otherwise be practically impossible to handle either during the electroding process or in subsequent assembly in transducer units such as those disclosed in United States Patent No. 2,386,279.

It should be understood that the drawings indicate the layers and facings schematically and that the actual proportion between plate thickness and facing thickness may be different than indicated. Various materials of low elastic modulus, solid or fibrous, may be used as protective facings, with or without metal foil reinforcement.

We claim:

1. An electromechanical assembly comprising an extremely thin, frangible piezoelectric plate, electrodes attached to opposite sides of said plate, and a facing adhered to at least one of said sides and electrodes, said facing extending over said opposite sides only to the edges of said sides, having a mass not substantially greater than that of the plate, and having an effective elastic modulus substantially less than said plate so as to permit substantially unimpeded edgewise vibration of said plate, and said facing being at least substantially one-half as thick as said plate so as to reinforce said plate flexurally, whereby said assembly may be handled without breaking said plate.

2. An electromechanical assembly comprising an extremely thin, frangible piezoelectric plate, electrodes attached to opposite sides of said plate, and a facing of organic plastic material adhered to at least one of said sides and electrodes, said facing extending over said opposite sides only to the edges of said sides, having a mass not substantially greater than that of the plate, and having an elastic modulus substantially less than said plate so as to permit substantially unimpeded vibration edgewise of said plate, and said facing being at least substantially one-half as thick as said plate so as to reinforce said plate flexurally, whereby said assembly may be handled without breaking said plate.

3. An electromechanical assembly comprising an extremely thin, frangible piezoelectric plate, electrodes attached to opposite sides of said plate, a facing adhered to at least one of said sides and electrodes, and a sheet of metal foil adhered over said facing for reinforcing the plate flexurally, said facing extending over said opposite sides only to the edges of said sides, having a mass not substantially greater than that of the plate, and having an elastic modulus substantially less than said plate and said facing being at least substantially one-half as thick as said plate so as to permit substantially unimpeded edgewise vibration of said plate, whereby said assembly may be handled without breaking said plate.

4. An electromechanical assembly comprising an extremely thin, frangible piezoelectric plate, electrodes attached to opposite sides of said plate, and a facing of fibrous sheet material impregnated with an adhesive of low solids content adhered to at least one of said sides and electrodes, said sheet and adhesive having an elastic modulus substantially less than said plate so as to permit substantially unimpeded vibration of said plate, and said facing being at least substantially one-half as thick as said plate so as to reinforce said plate flexurally, whereby said assembly may be handled without breaking said plate.

5. An electromechanical assembly comprising an extremely thin, frangible piezoelectric plate, electrodes attached to opposite sides of said plate, a facing of porous sheet material impregnated with an adhesive of low solids content adhered to at least one of said sides and electrodes, and a sheet of material substantially thinner and of substantially greater elastic modulus than said facing adhered to said facing for reinforcing the plate flexurally, said facing having an elastic modulus substantially less than said plate and said facing being at least substantially one-half as thick as said plate so as to permit substantially unimpeded vibration of said plate, whereby said assembly may be handled without breaking said plate.

6. An electromechanical assembly comprising an extremely thin, frangible piezoelectric plate, electrodes attached to opposite sides of said plate, a facing of fibrous sheet material impregnated with an adhesive of low solids content adhered to at least one of said sides and electrodes, and a sheet of metal foil adhered to said facing for reinforcing the plate flexurally, said facing having an elastic modulus substantially less than said plate and said facing being at least substantially one-half as thick as said plate so as to permit substantially unimpeded vibration of said plate, whereby said assembly may be handled without breaking said plate.

7. An electromechanical assembly comprising an extremely thin, frangible piezoelectric plate, electrodes attached to opposite sides of said plate, facings of laminated material over each of said sides and said electrodes, each of said laminated facings extending over said opposite sides only to the edges of said sides, having a mass not substantially greater than that of the plate, and having an effective edgewise elastic modulus less than one-fifth of that of the plate, said facing being at least one-half as thick as the plate, and an adhesive binder between each of said facings and said respective sides, whereby said plate is reinforced flexurally by said layer without substantially impeding edgewise vibration of the plate.

8. The method of making an electromechanical assembly including a thin piezoelectric plate made from a blank, comprising polishing one side of said blank, attaching an electrode to said side, temporarily attaching the electroded side of the blank to a rigid surface; and while the blank is attached to said surface eroding the other side of the blank until the blank is reduced to a plate of desired thickness, while the blank is still attached to said surface adhering to said other side a second electrode and a facing having a thickness at least one-half as great as the plate, and thereafter removing said assembled plate and facing from said surface.

References Cited in the file of this patent

UNITED STATES PATENTS

| | | |
|---|---|---|
| 2,035,013 | Roosenstein | Mar. 24, 1936 |
| 2,112,636 | Sawyer | Mar. 29, 1938 |
| 2,440,348 | Root | Apr. 27, 1948 |
| 2,478,223 | Argabrite | Aug. 9, 1949 |
| 2,511,624 | D'Halloy | June 13, 1950 |
| 2,589,403 | Kurie | Mar. 18, 1952 |
| 2,614,144 | Howatt | Oct. 14, 1952 |
| 2,691,159 | Heibel | Oct. 5, 1954 |